United States Patent
Tata

(10) Patent No.: US 10,558,615 B2
(45) Date of Patent: Feb. 11, 2020

(54) ATOMIC INCREMENTAL LOAD FOR MAP-REDUCE SYSTEMS ON APPEND-ONLY FILE SYSTEMS

(71) Applicant: INTERNATIONAL BUSINESS MACHINES CORPORATION, Armonk, NY (US)

(72) Inventor: Sandeep Tata, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 15/198,345

(22) Filed: Jun. 30, 2016

(65) Prior Publication Data
US 2016/0306799 A1  Oct. 20, 2016

Related U.S. Application Data

(63) Continuation of application No. 13/600,181, filed on Aug. 30, 2012, now Pat. No. 9,424,271.

(51) Int. Cl.
| | |
|---|---|
| *G06F 16/16* | (2019.01) |
| *G06F 16/18* | (2019.01) |
| *G06F 16/182* | (2019.01) |

(52) U.S. Cl.
CPC ........ *G06F 16/164* (2019.01); *G06F 16/1805* (2019.01); *G06F 16/1827* (2019.01); *G06F 16/1873* (2019.01)

(58) Field of Classification Search
CPC .................................................. G06F 16/164
See application file for complete search history.

(56) References Cited

U.S. PATENT DOCUMENTS

| | | | |
|---|---|---|---|
| 5,548,757 A | * | 8/1996 | Matsuyama .......... G06F 11/004 |
| 5,987,477 A | | 11/1999 | Schmuck et al. |
| 8,527,482 B2 | | 9/2013 | Heller et al. |
| 8,762,395 B2 | | 6/2014 | Chandrasekaran |

(Continued)

OTHER PUBLICATIONS

Nicolae, B. et al., "BlobSeer: Bringing High Throughput under Heavy Concurrency to Hadoop Map-Reduce Applications", Proceedings of the 24th International Symposium on Parallel & Distributed Processing (IPDPS), Apr. 19-23, 2010, pp. 1-11, IEEE, United States.

(Continued)

*Primary Examiner* — Van H Oberly
(74) *Attorney, Agent, or Firm* — Sherman IP LLP; Kenneth L. Sherman; Steven Laut

(57) ABSTRACT

Augmenting data files in a repository of an append-only file system includes maintaining a companion metadata file for each corresponding data file in a map-reduce system using the append-only file system. Each companion metadata file tracks a logical end-of-file (EOF) for each data file. Global versioning of each companion metadata is maintained. A map-reduce append job is performed for a set of data files using a current global version number for the companion metadata file. The map-reduce job including multiple append tasks. For each successful append job, a logical EOF for each appended file is incremented to a new physical EOF. For each failed append task of the append job, a logical EOF is maintained for each failed append task by not incrementing the logical EOF for each failed append task.

20 Claims, 13 Drawing Sheets

(56) References Cited

U.S. PATENT DOCUMENTS

| | | | |
|---|---|---|---|
| 2003/0088783 | A1 | 5/2003 | Dipierro |
| 2005/0232589 | A1 | 10/2005 | Kimura et al. |
| 2006/0288008 | A1 | 12/2006 | Bhattiprolu et al. |
| 2009/0171999 | A1* | 7/2009 | McColl .............. G06F 16/2465 |
| 2011/0125713 | A1 | 5/2011 | Kalle et al. |
| 2011/0313973 | A1 | 12/2011 | Srivas et al. |
| 2012/0030408 | A1* | 2/2012 | Flynn .................. G06F 12/0246 711/102 |

OTHER PUBLICATIONS

Discolo, A.V. et al., "A Distributed File System for 4.2BSD UNIX", IP.com Prior Art Database, Jan. 30, 1986, pp. 1-27, SPI Database of Software Technologies, United States.

Bhushan, A. et al., "The File Transfer Protocol (RFC0265)", IP.com Prior Art Database, Nov. 17, 1971, pp. 1-11, ISOC, United States.

Moise, D. et al., "Improving the Hadoop Map/Reduce Framework to Support Concurrent Appends through the BlobSeer BLOB management system", Proceedings of the 10th ACM International Symposium on High Performance Distributed Computing (HPDC'10), Jun. 20-25, 2010, pp. 834-840, ACM, United States.

U.S. Non-Final Office Action for U.S. Appl. No. 13/600,181 dated Jul. 10, 2014.

U.S. Final Office Action for U.S. Appl. No. 13/600,181 dated Jul. 10, 2014.

U.S. Advisory Action for U.S. Appl. No. 13/600,181 dated Mar. 5, 2015.

U.S. Non-Final Office Action for U.S. Appl. No. 13/600,181 dated Aug. 27, 2015.

U.S. Final Office Action for U.S. Appl. No. 13/600,181 dated Feb. 16, 2016.

U.S. Notice of Allowance or U.S. Appl. No. 13/600,181 dated May 11, 2016.

\* cited by examiner

30
/repository

/repository/NY.dat
| B0.1 |
| B0.3 |
| B0.7 |
| B0.11 |

↖ 31

/repository/CA.dat
| B0.4 |
| B0.5 |
| B0.8 |

↖ 32

/repository/TX.dat
| B0.2 |
| B0.6 |
| B0.9 |
| B0.10 |

30
/repository

/repository/NY.dat      /repository/CA.dat      /repository/TX.dat

| B0.1  |
| B0.3  |
| B0.7  |
| B0.11 |
↳ 31

| B0.4  |
| B0.5  |
| B0.8  |
| B1.1  |
| B1.2 (partial) |
↳ 32

| B0.2  |
| B0.6  |
| B0.9  |
| B0.10 |
↳ 33

/repository

/repository/NY.dat

| B0.1 |
| B0.3 |
| B0.7 |
| B0.11 |

↖ 31

/repository/CA.dat

| B0.4 |
| B0.5 |
| B0.8 |
| B1.1 |
| B1.2 (partial) |
| B1.1 |
| B1.2 |

↖ 32

/repository/TX.dat

| B0.2 |
| B0.6 |
| B0.9 |
| B0.10 |

ATOMIC INCREMENTAL LOAD FOR MAP-REDUCE SYSTEMS ON APPEND-ONLY FILE SYSTEMS

BACKGROUND

In most modern enterprises, analyzing large amounts of data efficiently and quickly is important. One analysis tool is map-reduce style of program, including a map-phase, a shuffle-phase and a reduce-phase. In one example, in the map-phase, a primary node divides input data (problem) into subsets and distributes the subsets to processing nodes, wherein each processing node computes an intermediate output. In the reduce-phase, the processing nodes combine the results for all the subsets to form an output as the results (answer) to the input data. Between the map-phase and reduce-phase, in a shuffle-phase the data is shuffled (sorting and exchanging between nodes) in order to move the data to the node that reduces it.

A common pattern for systems that analyze large amounts of data is to have a central repository where data gathered from different sources are deposited regularly. This repository may contain a cleaned-up version of the original raw data, often in a binary form that is efficient to read and process. There are many ways to organize this repository on the file system. For example, the repository may be partitioned on an attribute, and data may be placed in a different directory for each value of the attribute.

For such organized repositories, it is important to be able to safely append to a set of files during a map-reduce job so that the files continue to be readable under various failure scenarios. Map-reduce systems such as Hadoop typically use a non-POSIX file system (e.g., Hadoop Distributed File System (HDFS)) that can only be appended to. Consequently, it is not possible to delete the partially appended data that may be in different files when various tasks of jobs fail. Simply creating (potentially small) new files each time under the organized structure can have substantial overhead in a file system designed for large files.

SUMMARY

Embodiments provide incremental augmentation of data files on map-reduce systems using append-only file systems. One embodiment comprises augmenting data files in a repository of an append-only file system by maintaining a companion metadata file for each corresponding data file in a map-reduce system using the append-only file system. Each companion metadata file tracks a logical end-of-file (EOF) for each data file. Global versioning of each companion metadata is maintained. A map-reduce append job is performed for a set of data files using a current global version number for the companion metadata file. The map-reduce job including multiple append tasks. For each successful append job, a logical EOF for each appended file is incremented to a new physical EOF. For each failed append task of the append job, a logical EOF is maintained for each failed append task by not incrementing the logical EOF for each failed append task.

These and other aspects, features and advantages of the embodiments will be understood with reference to the drawing figures, and detailed description herein, and will be realized by means of the various elements and combinations particularly pointed out in the appended claims. It is to be understood that both the foregoing general description and the following brief description of the drawings and detailed description are exemplary and explanatory of preferred embodiments, and are not restrictive of the embodiments, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 shows an example repository including data files on an append-only file system;

FIG. 4 shows the repository of FIG. 3 wherein a batch of data is loaded to be appended to a file in the repository;

FIG. 5 illustrates the repository state after a failed append;

The detailed description explains the preferred embodiments of the invention, together with advantages and features, by way of example with reference to the drawings.

DETAILED DESCRIPTION

The embodiments may be understood more readily by reference to the following detailed description of the embodiments taken in connection with the accompanying drawing figures, which form a part of this disclosure. It is to be understood that the embodiments are not limited to the specific devices, methods, conditions or parameters described and/or shown herein, and that the terminology used herein is for the purpose of describing particular embodiments by way of example only and is not intended to be limiting of the claimed embodiments.

One or more exemplary embodiments are described below in detail. The disclosed embodiments are intended to be illustrative only since numerous modifications and variations therein will be apparent to those of ordinary skill in the art.

Embodiments enable augmenting data files in a repository of an append-only file system by maintaining metadata corresponding to each data file for tracking a logical end-of-file (EOF) for each data file for appending. A global versioning mechanism for the metadata allows selecting the current version of the metadata to read for performing an append job for a set of data files. Each append job comprises multiple append tasks. For each successful append job, the global versioning mechanism increments a valid metadata version to use for each data file appended. Said valid metadata version indicates the logical EOF corresponding to a new physical EOF for each of the data files appended.

Figure 1:
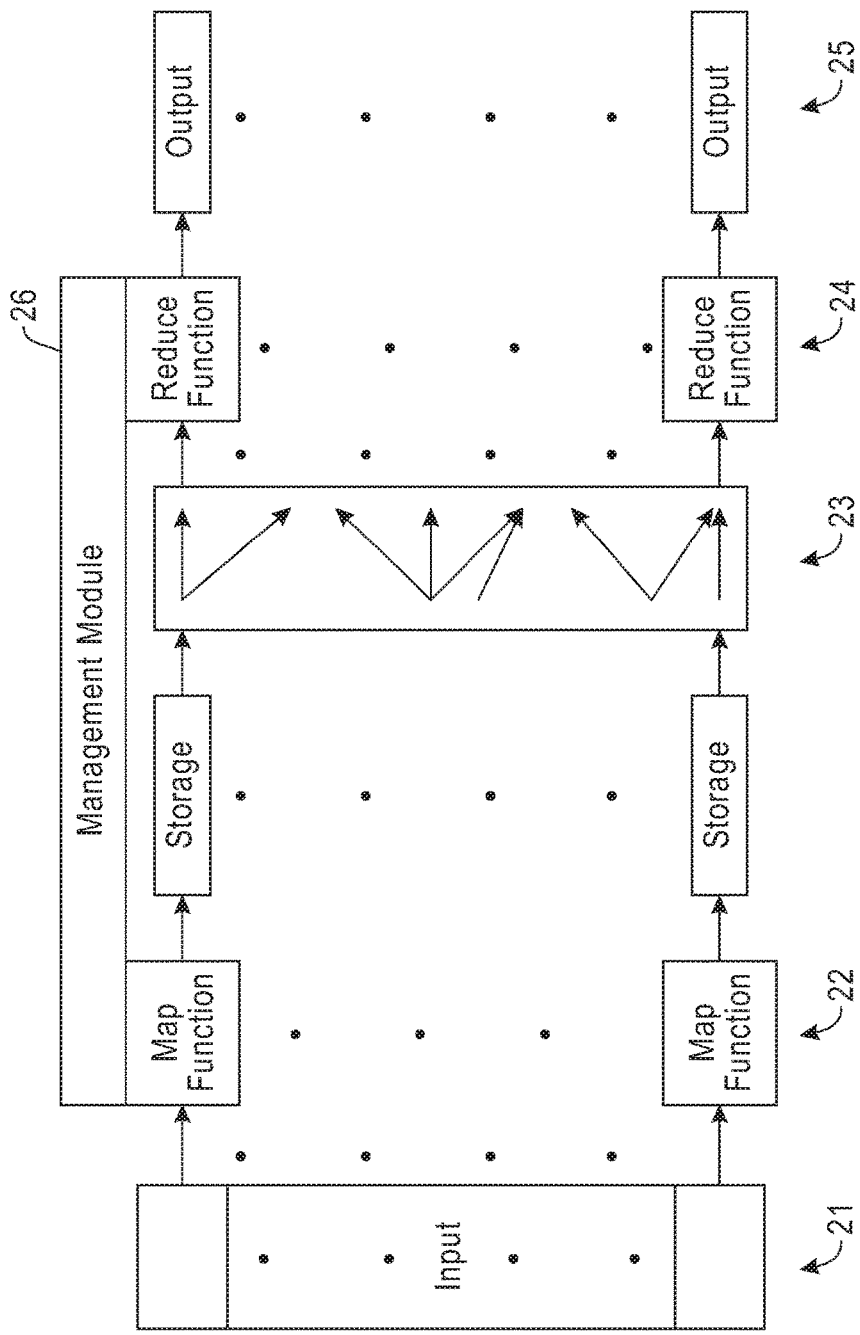
FIG. 1 shows a schematic of a map-reduce computation utilizing a management process for atomic incremental load for map-reduce systems on append-only file systems, according to an embodiment of the invention.

In one embodiment, the present invention provides a management process for atomic incremental load for map-reduce systems on append-only file systems. FIG. 1 shows a simplified schematic of a map-reduce architecture for a map-reduce job, utilizing a management process atomic incremental load for map-reduce systems on append-only file systems, according to an embodiment of the invention. Input 21 is divided into subsets and mapped via map functions 22 in a map-phase which generate output units each with a key. The output units from the map functions are passed to a shuffle 23 in a shuffle-phase which rearranges the units wherein all values with the same key are grouped together. Reduce functions 24 receive a key and a list of values in a reduce-phase, and generate more records which are stored in output files 25. A management module 26 that implements said management process for atomic incremental load for map-reduce on an append-only file system, according to an embodiment of the invention.

Figure 2:
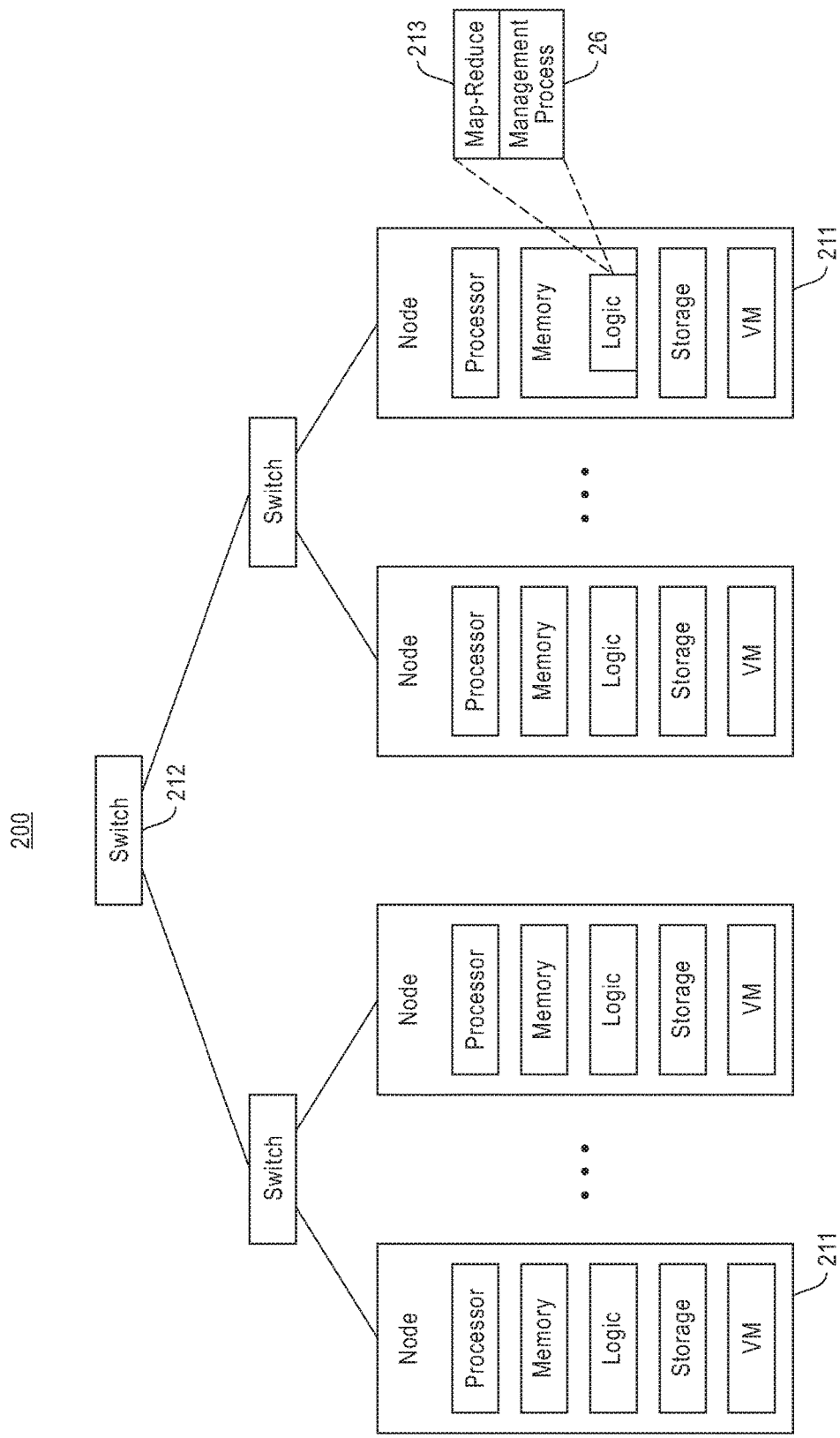
FIG. 2 shows a block diagram of an information technology system including a computing cluster having a management process for atomic incremental load for map-reduce applications on append-only file systems, according to an embodiment of the invention.

FIG. 2 shows an architecture of an example computing network cluster 200 including computing nodes 211 in a rack interconnected via network switches 212, implementing embodiments of the invention. The cluster 200 includes a map-reduce program 213 and a management module 26, according to an embodiment of the invention. Other architectures may also be utilized as described further below in relation to FIGS. 11-12.

As used herein, the term repository refers to a collection of files, possibly organized into a set of directories. Map-reduce jobs are submitted for processing and each map-reduce job may include several map and reduce tasks. A split is a unit of scheduling and is a non-overlapping partition of the input data that is assigned to a map task.

An InputFormat is an abstraction that is responsible for two main functions: first, to generate splits of the data that can each be assigned to a map task; and second, to transform data on disk to the typed key and value pairs that are required by the map function. An InputFormat implements the following three methods:

addInputPath( ) is used to specify input data sets when configuring the job.
getSplits( ) is used by the Hadoop scheduler to obtain a list of splits for the job.
getRecordReader( ) is invoked by Hadoop to obtain an implementation of a RecordReader, which is used to read the key and value pairs from a given split.

Similarly, an OutputFormat is responsible for transforming typed key-value pairs into the bytes written to the file system. OutputCommitter is an abstraction that can be associated with a given map-reduce job for a given Output-Format that provides hooks for actions to be performed at various times such as commitTask, abortTask, commitJob, and abortJob.

FIG. 3 shows a repository 30 including three files 31, 32, 33 (i.e., NY.dat, CA.dat, TX.dat). In one example, the repository comprises sales data organized on a file system using text data files, a single file per state. FIG. 3 illustrates the repository 30 partitioned by state (i.e., 31, 32, 33).

Loading a new batch of data can be achieved in a single map-reduce job by gathering all the data for a given state at a single reducer and having that reducer append to the appropriate file to the repository 30. FIG. 4 illustrates an example wherein a batch of data (B1) with two records (B1.1 and B1.2) is loaded to be appended to the CA.dat file 32 in the repository 30. If the append task fails before completion, then as shown the CA.dat file 32 contains partly written records.

FIG. 4 illustrates the repository state after a failed append. Specifically, FIG. 4 illustrates that the CA.dat file 32 contains partially appended results (i.e., records B1.1 and B1.2) as a result of the failed task. If the reducer is rescheduled, as is the default behavior for Hadoop, the same data may now be appended again to the same file.

FIG. 5 illustrates the repository state after retrying the load job. Specifically, FIG. 5 shows that B1.1 and B1.2 are added again after the partial copies appended during the previous (failed) attempt of appending to CA.dat file 32 in the repository 30.

Retrying a failed job that had some successful tasks and some failed tasks also causes a problem. In one example, a larger batch of data with two records for each of the three states in FIGS. 3-5 is loaded. If a task appending to the NY and TX files completed successfully, but a task appending to CA file failed (i.e., the map-reduce job failed), then if the job is retried and succeeds, all the files will have redundantly appended data, and potentially some partially written records in the CA file.

Many map-reduce implementations such as the popular open-source system Hadoop, use a non-POSIX append-only file system. As a result, partially appended data cannot be deleted even if the failed tasks were detected and the information tracked. Existing systems cannot handle failed tasks and jobs.

One way of avoiding the append problem is to always add a new file. In the example scenario above, if a directory is maintained per state (NY, CA, TX), then each new batch of data can be added in a separate file within the directory. The disadvantage of this approach is that each batch of data may be small (this leads to a large number of small files in the file system). However, HDFS is optimized for large files. Fragmentation of the data into a large number of small files will cause many performance and manageability problems.

Embodiments of the invention provide a management process that allows atomic append to a set of files on HDFS. Embodiments of the invention are applicable to any map-reduce system using an append-only file system, and example embodiments of the invention are described herein in the context of Hadoop and HDFS.

An embodiment of the invention provides a management process that augments any existing file format on HDFS with the ability for safe appends. In one implementation of the present invention, a metadata file includes metadata comprising book-keeping information maintained for each file in a repository.

In one embodiment of the invention, the management process maintains a metadata file that corresponds to each data file to track the logical end-of-file (EOF) for each file. After every successful append task, the logical EOF for each of the files appended is incremented to the new physical EOF.

If the append task fails, the logical EOF is not incremented. Subsequent tasks that read the data file will use the metadata to stop reading when they get to the logical EOF even if the physical EOF is not reached.

At the next successful append, the metadata file is updated to skip the region corresponding to the failed append (this region is referred to as an invalid region).

The logical EOF is updated to the end of the file. A RecordReader that reads this file can now skip the invalid region and read through to the logical EOF. The increments of the metadata files corresponding to all the files that are appended to in a given job are tracked. These files are updated atomically. This can be performed versioning without resorting to an atomic commitment protocol like 2-Phase commit, according to an embodiment of the invention.

Metadata Versioning

According to an embodiment of the management process, each file in the repository is augmented with a companion metadata file that tracks the logical EOF of that file. The metadata maybe maintained at various locations such as a separate database or as a service on the namenode. In one example implementation regular files in HDFS are used for the metadata file storage. The metadata file is versioned (and is always replaced, never updated).

In one implementation of the management process, modified read and write protocols take the metadata into account in order to safely append data and ignore the effects of partially appended bytes. In one implementation the management process employs modified Input/OutputFormats that do not require changes to the underlying map-reduce system such as Hadoop.

Figure 6A:
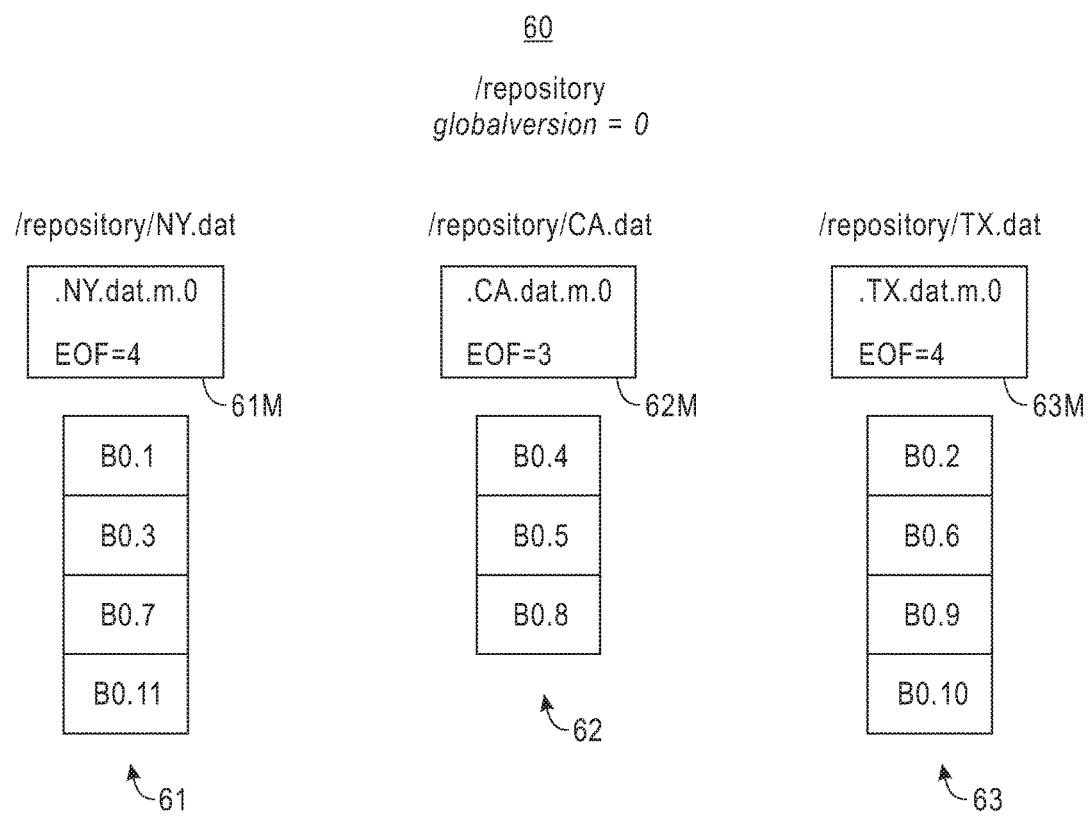
FIG. 6A shows an example repository including data files and corresponding metadata files on append-only file system as maintained by a management process, according to an embodiment of the invention.

FIG. 6A illustrates an example repository 60 including three data files 61, 62, 63 that are augmented with metadata files 61M, 62M, 63M, respectively, according to an embodiment of the management process. Specifically, FIG. 6A illustrates the repository 60 including three data files CA.dat, NY.dat and TX.dat which are augmented with metadata files.ca.dat.m.0, .ny.dat.m.0 and .tx.dat.m.0, respectively, using a write protocol according to an embodiment of the invention. The last part of the metadata filename is simply a version number (in this example 0). Table 1 below shows a pseudo code of said write protocol, according to an embodiment of the invention.

TABLE 1

Figure 6B:
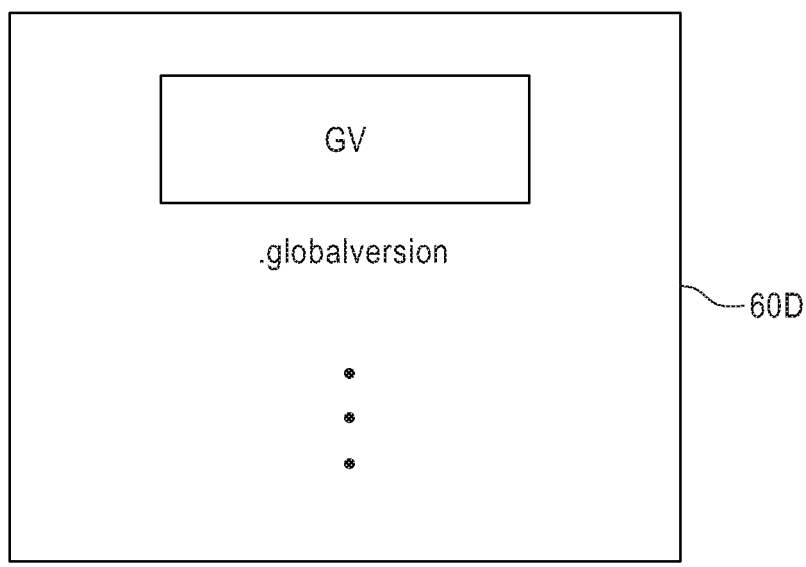
FIG. 6B shows an example directory structure for the repository of FIG. 6A, according to an embodiment of the invention.

Write Protocol 1. read curVersion from ".globalversion"
2. if a ".lock" file exists,
   then quit with the message "Cannot have concurrent writers"
3. else create a ".lock" file
4. set newVersion = curVersion + 1
5. for each task,
6.   if there is already a metadata file with version newVersion, then
7.     delete the metadata file
8.   on completion, in commitTask create new metadata file with newVersion
9. end for
10. if the job completes successfully,
    then in the outputcommitter,
    atomically write new version to ".globalversion"
11. end Further, as illustrated in FIG. 6B, a global version number (GV) for each current valid metadata file is stored in a repository directory 60D in a separate file named ".globalversion".

According to an embodiment of the invention, when a map-reduce job is launched to append data into the repository, the map-reduce job reads the current value in ".globalversion" file, and numbers the next metadata file to curVersion+1. For example, at the end of such a map-reduce job, if any of the input data is added to the "CA.dat" data file, a new metadata file called ".CA.dat.m.1" is written (e.g., in the same directory as other metadata files). If the entire map-reduce job succeeds, then the ".globalversion" file is replaced with a new metadata file that contains the latest valid version number (i.e., curVersion+1). If the job fails, the metadata file version number is not updated, and the existing metadata file version remains valid.

According to an embodiment of the management process, a map-reduce job uses a modified read protocol for reading the repository using the current global version number for a metadata file. This is used to select the appropriate metadata file version when reading each of the data files in the repository. A RecordReader for any file format reads the metadata file to know two pieces of information:

1. the logical EOF so that any data written beyond it is not read, and
2. the list of invalid regions to skip.

The largest version number less than or equal to the curVersion is the current valid version of the metadata file. An example pseudo code for said read protocol according to an embodiment of the invention, is shown in Table 2.

TABLE 2

Read protocol 1. read curVersion from ".globalversion"
2. for each file being read
3.   locVer = max metdata version <= curVersion
4.   read the metadata file numbered locVer
5.   configure the RecordReader for each split with the invalid regions and the logical EOF
6.   read the data up to the logic EOF, skipping over the invalid regions
7. end for
8. end It is possible that the metadata versions corresponding to certain data files in the repository is much lower than the current valid global version number. This can occur if there are append jobs that only append to some files in the repository, but not others. In such a case, the largest metadata version less than or equal to the global version is the latest valid metadata information for any given file.

Figure 7:
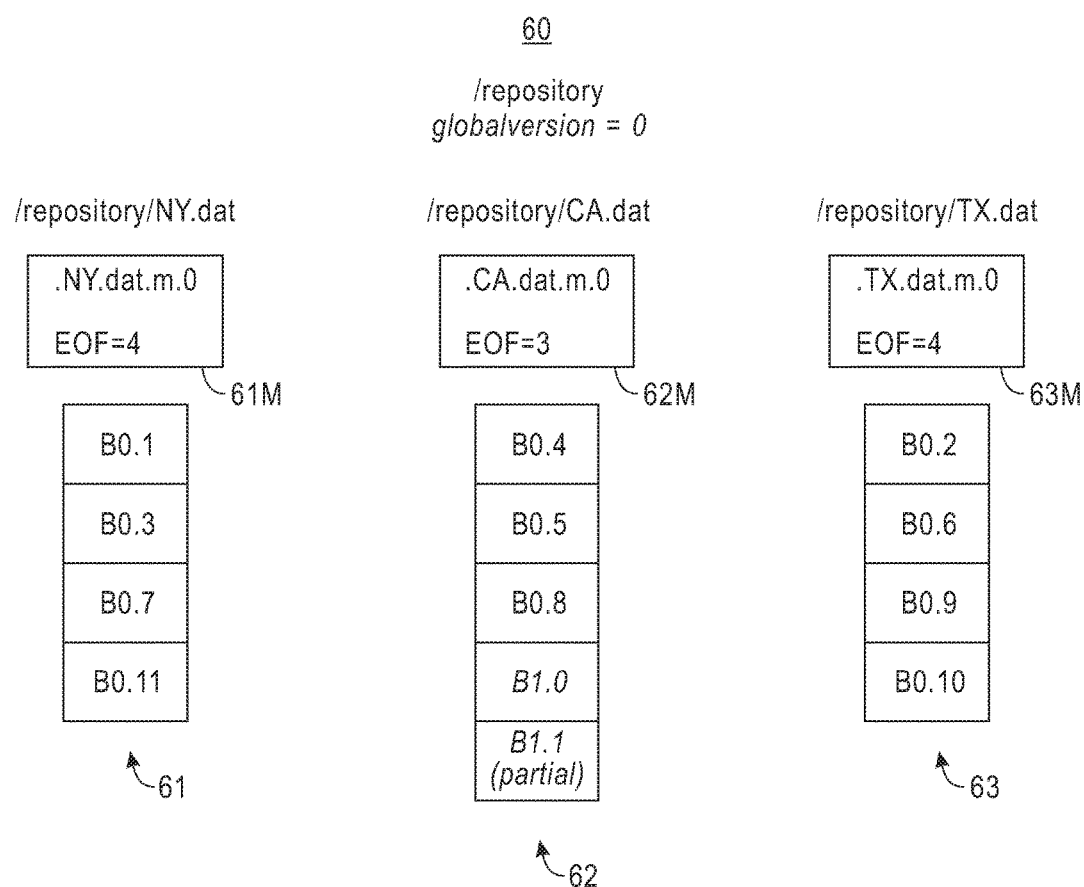
FIG. 7 shows a state of repository of FIG. 6A after a failed append with a partially appended data file, according to an embodiment of the invention.

FIG. 6A shows the repository 60 augmented with the metadata files and the global version. In this example, the metadata files are shown tracking the logical EOF using the number of records (in another example this can be a byte offset). FIG. 7 illustrates that according to an embodiment of the invention after a failed append, where records B1.1 and B1.2 in repository 60 are partially appended to CA.dat file, the logical EOF in.CA.dat.m.0 remains at 3. Because the batch of data only contained records for CA.dat file, the other files are not affected. Further, because the task failed, and therefore the job failed, the global version also remains at 0.

Figure 8:
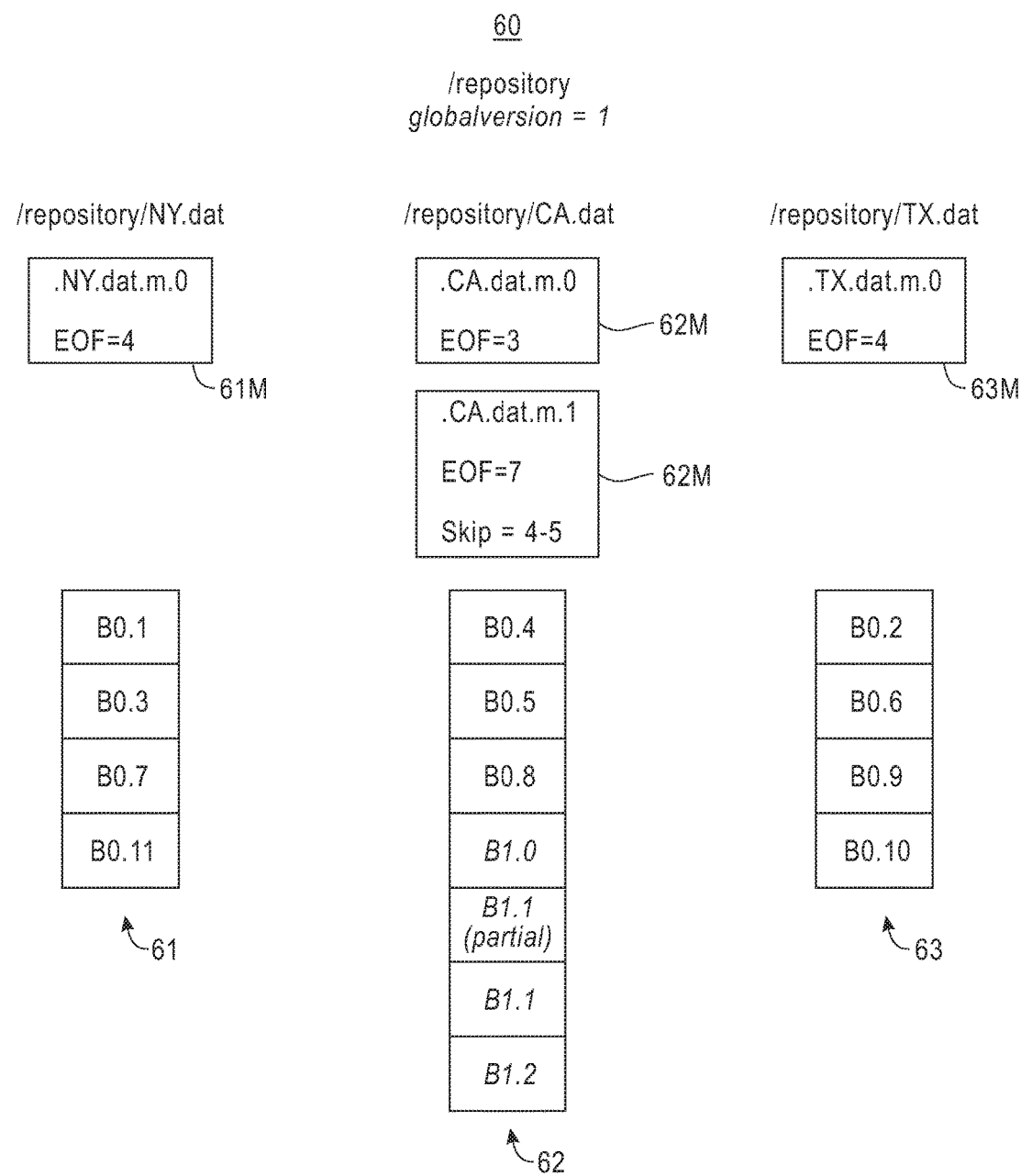
FIG. 8 shows a state of repository of FIG. 7 after the append is re-tried and it succeeds, wherein a new metadata file is created, according to an embodiment of the invention.
Figure 9:
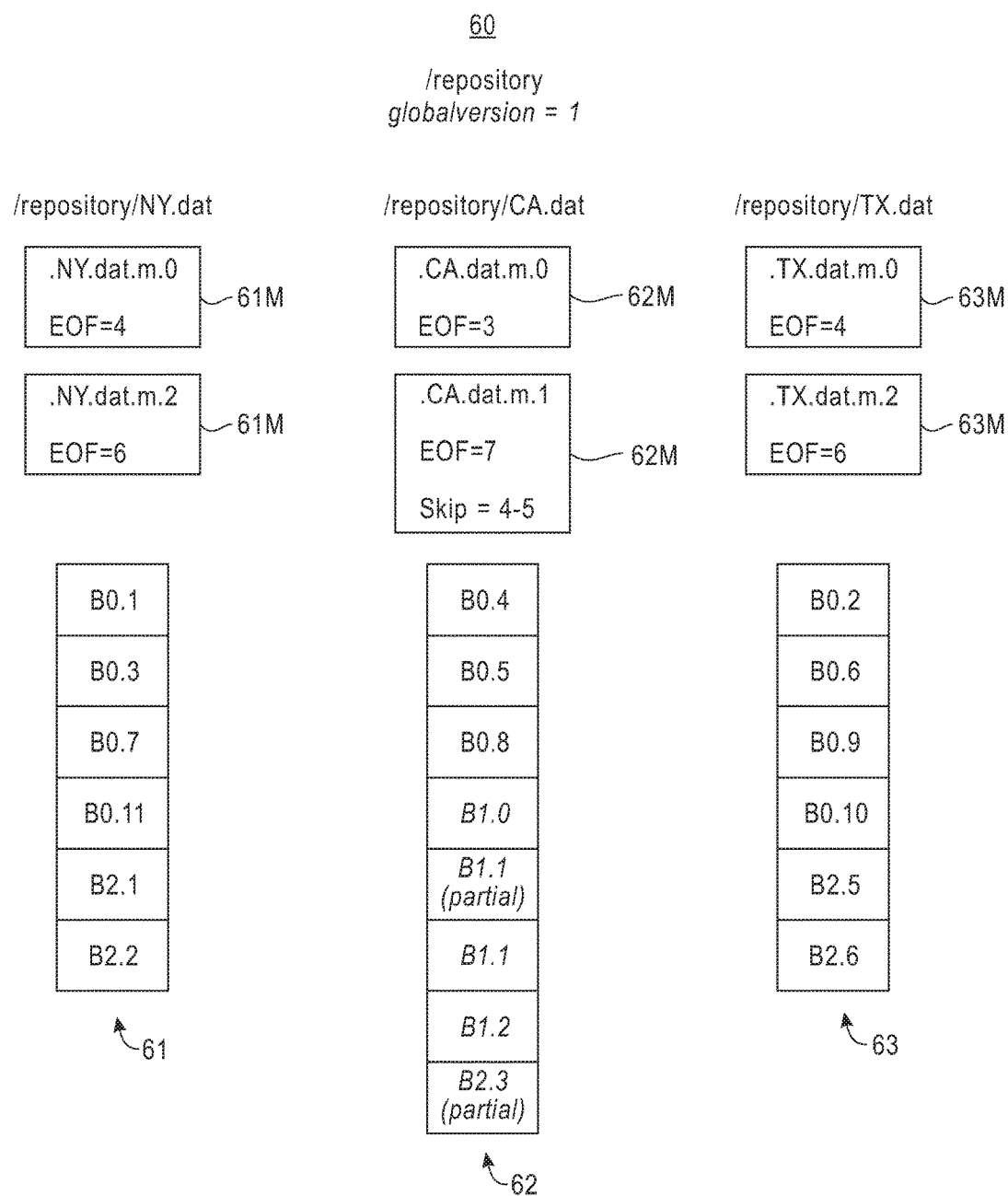
FIG. 9 shows a state of repository of FIG. 8 with multiple versioned metadata files, after atomic incremental load of the append-only file system, according to an embodiment of the invention.

FIG. 8 shows the state of the repository 60 after the append job is re-tried and it succeeds, according to an embodiment of the management process. A new metadata file.CA.data.m.1 is created that points to the new state. As shown in FIG. 9 according to an embodiment of the invention, the NY.dat and TX.dat files also have a new metadata file with version number 2, because newVersion=curVersion+1=2. Because in this example the CA.dat append task failed, no new metadata file is created for CA.dat. Further, because the job failed (due to failure of CA.dat append task), then the .globalversion remains at 1. When a new job is launched to read the current data, then curVersion=1 is used.

Further, locVersion for NY.dat and TX.dat is 0, since that is the largest version less than or equal to the cur Version. The metadata file for NY.dat and TX.dat version 2 is not used. In one implementation, using the logic in Table 1 (lines 6, 7), the metadata version 2 files will be deleted.

The management process described and illustrated in relation to FIGS. 6-9, provides atomic incremental loads on map-reduce systems using append-only file systems. In one embodiment the present invention provides tracking metadata for each of the data files as a separate file, and uses global versioning of the metadata files to select the current/valid version of a data file to read. The management process tracks metadata for each of the data files as a separate file, and uses global versioning of the metadata files to select the current/valid version of a data file to read.

Figure 10:
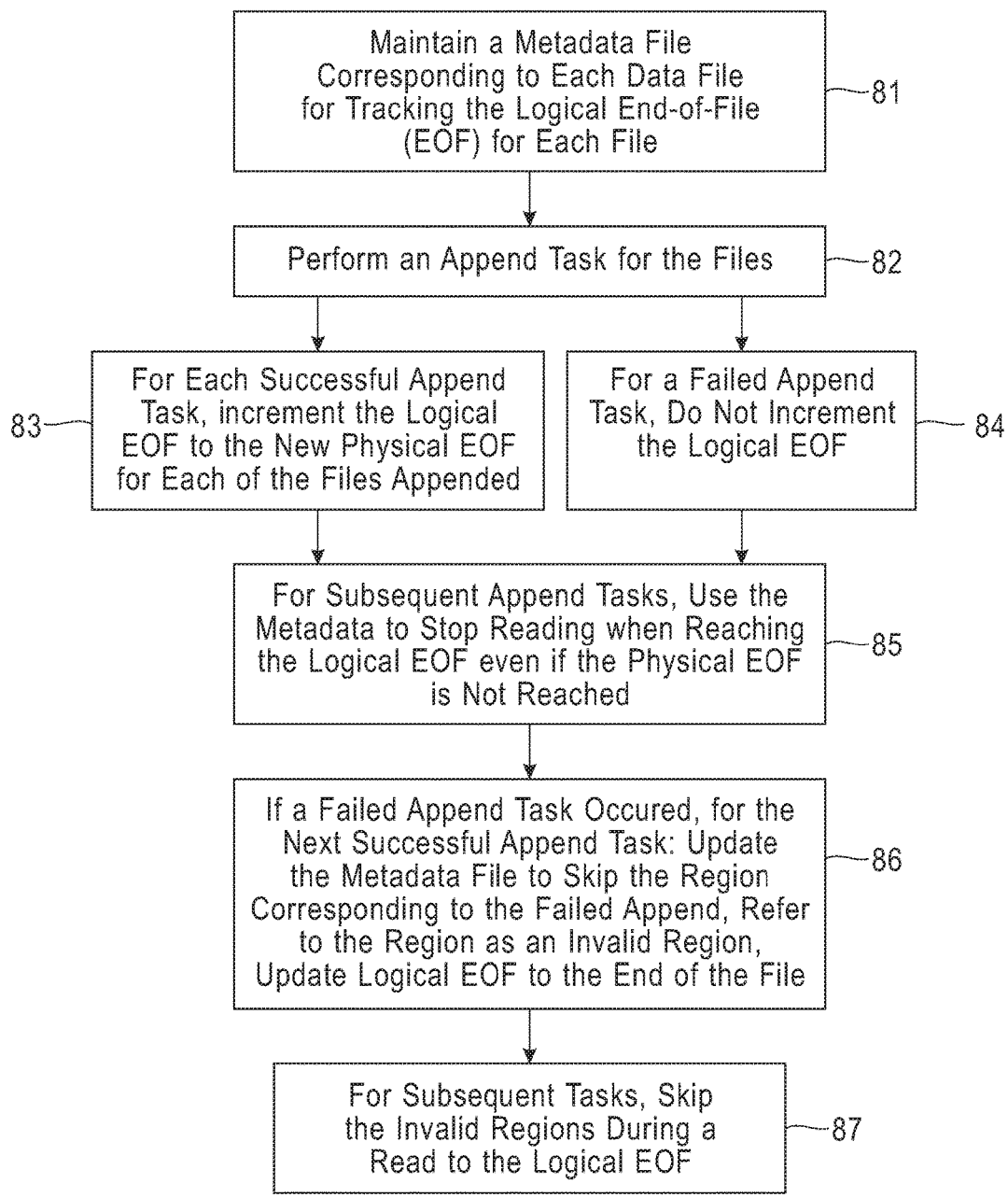
FIG. 10 shows a flowchart illustrating a management process for atomic incremental load of the append-only file system, according to an embodiment of the present invention.

FIG. 10 below shows a flowchart of an embodiment of the management process 80, according to an embodiment of the invention. Process block 81 comprises maintaining a metadata file corresponding to each data file for tracking the logical end-of-file (EOF) for each file. Process block 82 comprises performing an append task for the files. Process block 83 comprises, for each successful append task, incrementing the logical EOF to the new physical EOF for each of the files appended.

Process block 84 comprises, for a failed append task, not incrementing the logical EOF. Process block 85 comprises, for subsequent append tasks, using the metadata to stop reading when reaching the logical EOF even if the physical EOF is not reached. Process block 86 comprises: if a failed append task occurred, for the next successful append task, update the metadata file to skip the region corresponding to the failed append, refer to the region as an invalid region, and update logical EOF to the end of the file. Process block 87 comprises, for subsequent tasks, skipping the invalid regions during a read to the logical EOF.

Isolation

In one embodiment the present invention provides an isolation feature that is useful with large repositories managed on Hadoop, comprising isolation between readers/writers such that analysis jobs can continue to run while a load (i.e., append) is in progress. Because the ".globalversion" file determines which version of the metadata will be read, this in turn determines the logical EOF up to which a RecordReader reads. A map-reduce job that starts with a particular value of the global version will only read data that was valid for that version. This holds true even if a load job starts after a read job and completes before the read job finish.

Maintenance

In one embodiment the present invention provides periodic garbage collection for resources in the system. Garbage collection is performed for the storage space corresponding to all the invalid regions in the different files. If failures are uncommon, a smaller quantity of space will be used by the invalid regions, and an occasional cleanup should suffice. Garbage collecting these regions comprises rewriting the file, omitting the invalid regions, and updating the metadata file to purge it of all the invalid regions, and pointing to the new logical EOF.

In one implementation, said garbage collection is performed in a large map-reduce job during which all other reads are stopped. However, because not all the files need to be updated at once, a background garbage collection process that executes with low priority can be used to clean up a small number of files at a time.

The old metadata files for each data file also need to be garbage collected periodically. As noted, the largest version number less than or equal to the curVersion is the current valid version of the metadata file. Any metadata files versioned greater than that are from successful tasks from a failed job, and are be discarded at the next append according to the logic in line 5 of Table 1. Any metadata files versioned smaller than the current valid version are older versions and can also be discarded. However, these metadata files can be retained to support queries of the form "run this map-reduce job over version X of the data".

Figure 11:
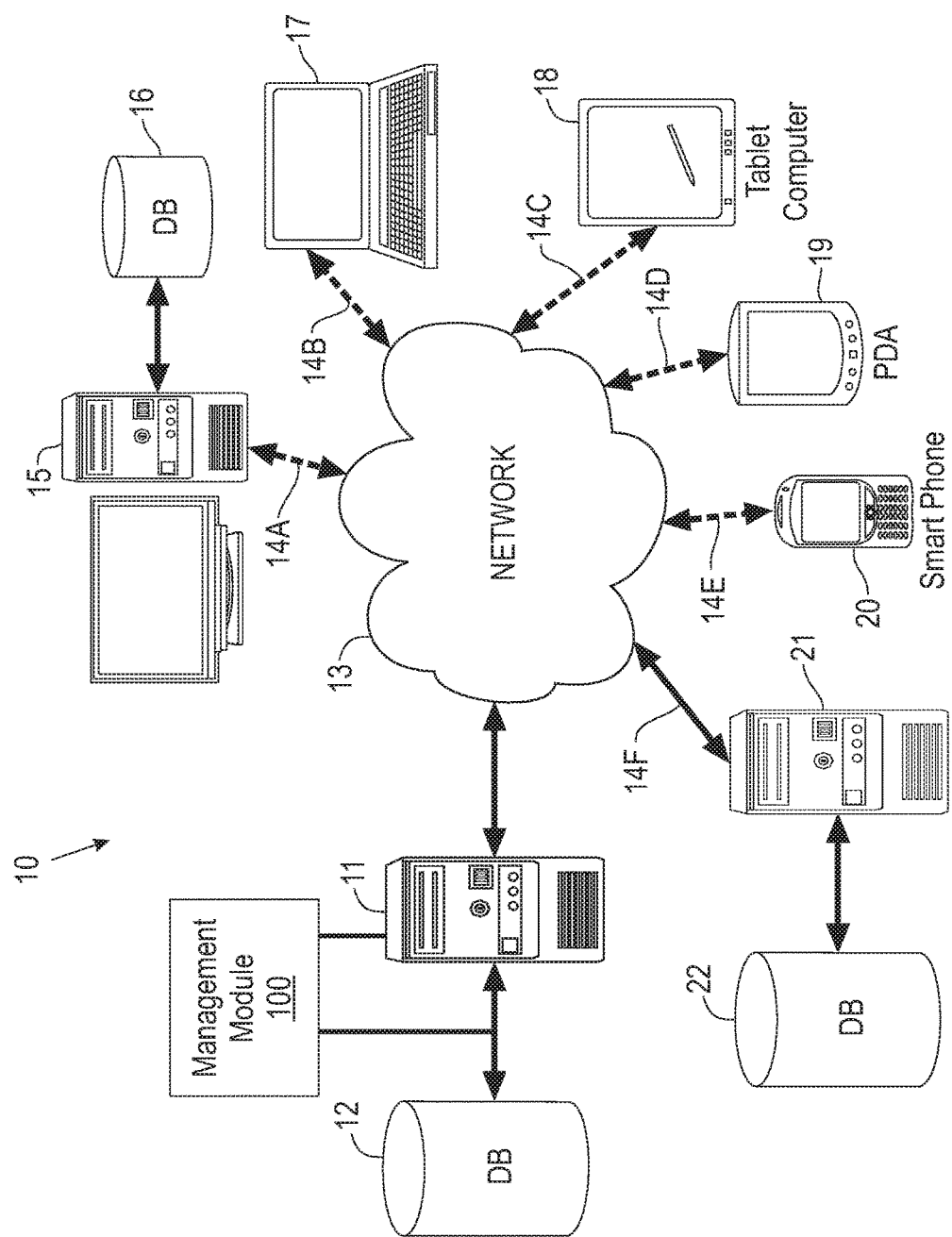
FIG. 11 is a block diagram illustrating an example of the network environment for a management process, according to an embodiment of the present invention.

FIG. 11 illustrates an example of the basic components of a system 10 utilizing a management module 100 implementing a management process atomic incremental load for map-reduce systems on append-only file systems, according to an embodiment of the present invention. The system 10 includes a server 11 and the remote devices 15 and 17-20.

Each of the remote devices 15 and 17-20 has applications and can have a local database 16. Server 11 contains applications, and a database 12 that can be accessed by remote devices 15 and 17-20 via connections 14(A-F), respectively, over network 13. The server 11 executes applications and may controls access to itself and database 12. The remote devices 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote devices 15 and 17-20 may each be located at remote sites. Remote devices 15 and 17-20 include but are not limited to, PCs, workstations, laptops, handheld computers, pocket PCs, PDAs, pagers, WAP devices, non-WAP devices, cell phones, palm devices, printing devices and the like. Included with each remote device 15 and 17-20 is an ability to request information. Thus, when a user at one of the remote devices 15 and 17-20 desires to access information from the database 12 at the server 11, the remote devices 15 and 17-20 communicate over the network 13, to access the server 11 and database 12. Third party computer systems 21 and databases 22 can also be accessed.

Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 12:
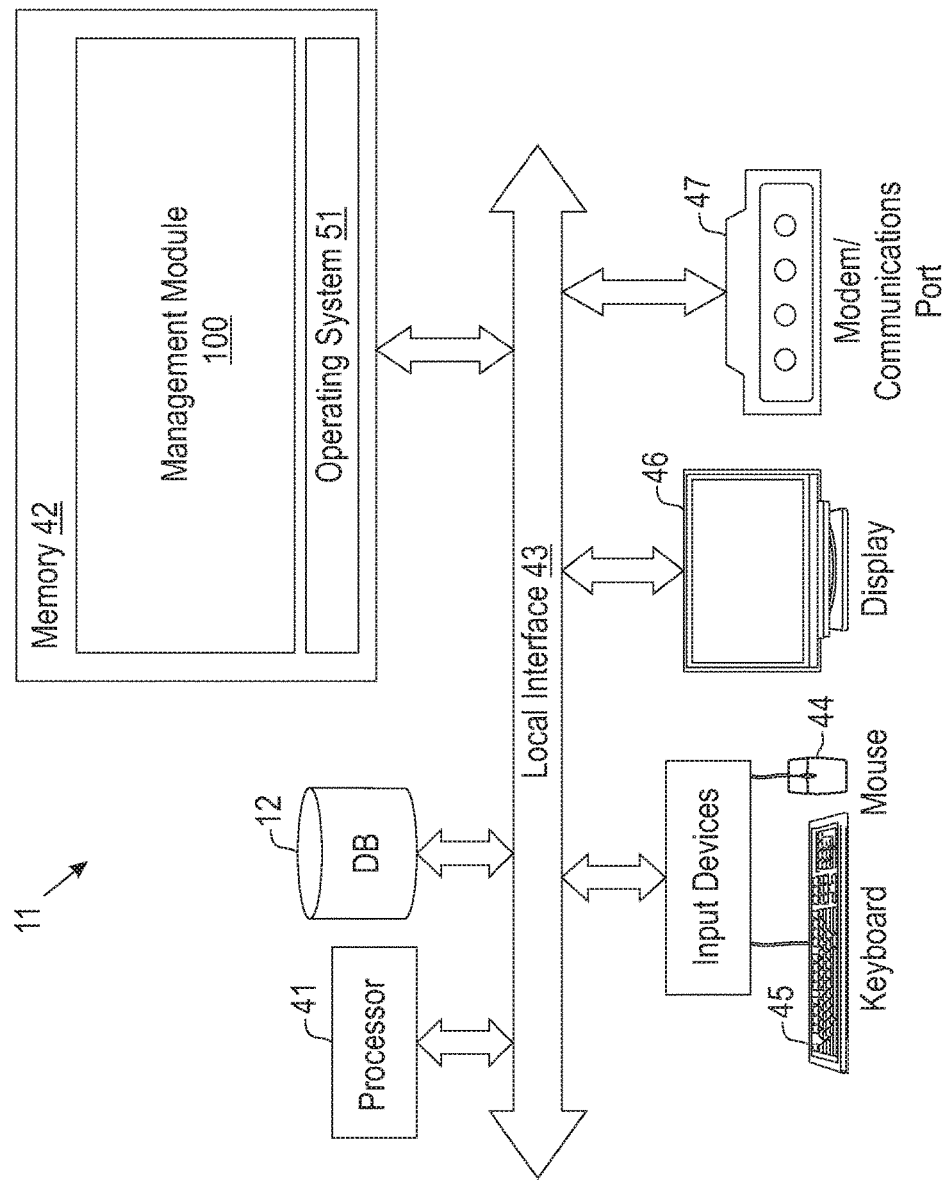
FIG. 12 is a block diagram illustrating an example of a server utilizing a management process, according to an embodiment of the present invention, as shown in FIG. 11.

Illustrated in FIG. 12 is a block diagram demonstrating an example of server 11, as shown in FIG. 11, utilizing the module 100 according to an embodiment of the present invention. Server 11 includes, but is not limited to, database servers, PCs, workstations, laptops, PDAs, palm devices, computer systems, storage servers, and the like. The processing components of the third party computer systems are similar to that of the description for the server 11 (FIG. 12).

Generally, in terms of hardware architecture, as shown in FIG. 12, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 12, the software in the memory 42 includes a suitable operating system (O/S) 51 and the module 100 of the present invention. The module 100 comprises functional components and process blocks described further below.

The operating system 51 essentially controls the execution of other computer programs, such as the module 100, and provides scheduling, input/output control, file and data management, memory management, and communication control and related services. However, the module 100 of the present invention is applicable on all other commercially available operating systems.

The module 100 may comprise a source program, executable program (object code), script, or any other entity comprising a set of computer program instructions to be performed. When the module 100 is a source program, then the program is usually translated via a compiler, assembler, interpreter, or the like, which may or may not be included within the memory 42, so as to operate properly in connection with the O/S 51. Furthermore, the module 100 can be written as (a) an object oriented programming language, which has classes of data and methods, or (b) a procedure programming language, which has routines, subroutines, and/or functions, for example but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The module 100 and the O/S 51 are read, in whole or in part, by the processor 41, perhaps buffered within the processor 41, and then executed.

When the module 100 is implemented in software, as is shown in FIG. 12, it should be noted that the module 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the embodiments may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the module 100 is implemented in hardware, the module 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the module 100 of the on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 12. Herein, the remote devices 15 and 17-20 are referred to as remote devices 15 for the sake of brevity.

Embodiments are further useful in a cloud computing environment, including multiple connected could computing nodes. Each node may comprise a computer system/server such as personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Nodes may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices are intended to be illustrative only and that computing nodes and cloud computing environment can communicate with any type of computerized device over any type of network and/or network addressable connection (e.g., using a web browser).

Aspects of the embodiments are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments, particularly, any "preferred" embodiments, are merely possible examples of implementations, merely set forth for a clear understanding of the principles of the invention. Many variations and modifications may be made to the above-described embodiment(s) without departing substantially from the spirit and principles of the invention. All such modifications and variations are intended to be included herein within the scope of this disclosure and the embodiments and protected by the following claims.

What is claimed is:

1. A method of augmenting data files in a repository of an append-only file system, comprising:
    maintaining a companion metadata file for each corresponding data file in a map-reduce system using the append-only file system, wherein each companion metadata file tracks a logical end-of-file (EOF) for each data file;
    maintaining global versioning of each companion metadata;
    performing a map-reduce append job for a set of data files using a current global version number for the companion metadata file, wherein the map-reduce job including multiple append tasks;
    for each successful append job, incrementing a logical EOF for each appended file to a new physical EOF;
    for each failed append task of the append job, maintaining a logical EOF for each failed append task by not incrementing the logical EOF for each failed append task; and
    upon a determination that an existing metadata file exists with a version value set to a new version value, deleting the metadata file and creating a new metadata file on completion of a write instruction.

2. The method of claim 1, wherein global versioning is used to increment a valid companion metadata file version for each data file appended, and said valid companion metadata file version indicates the logical EOF corresponding to the new physical EOF for each of the data files appended.

3. The method of claim 2, wherein subsequent append tasks that read a data file for retrying failed append tasks use metadata to stop reading upon reaching the logical EOF for the failed append task even when a current physical EOF is not reached.

4. The method of claim 1, further comprising:
    for a failed data file append task, maintaining a current companion metadata file version for the data file, wherein partially appended bytes are ignored.

5. The method of claim 1, further comprising:
    for a failed append task:
        in a next successful append task updating the companion metadata file to skip a region corresponding to a failed append task; and
        in subsequent tasks, referring to the skipped region as an invalid region; and
    after a failed append task, in a subsequent append task, incrementing the logical EOF to a new physical EOF.

6. The method of claim 4, further comprising:
    using a single writer for write instructions to avoid concurrent writers; and
    creating a new metadata file with the version set to the new version value.

7. The method of claim 4, further comprising:
    for each data file being read:
        setting a local version value of a file to a maximum metadata version value;
        reading a metadata file having the local version value;
        configuring a record reader for each record, split with invalid regions and the logical EOF; and
        reading data up to the logical EOF while skipping over invalid regions.

8. The method of claim 4, further comprising:
    performing periodic garbage collection comprising rewriting a data file, omitting invalid regions, updating the metadata file to purge all of the invalid regions, and pointing to the new logical EOF.

9. The method of claim 8, wherein garbage collection is performed while all other read instructions are stopped.

10. The method of claim 1, wherein the file system comprises a Hadoop Distributed File System (HDFS).

11. A computer program product for augmenting data files in a repository of an append-only file system, the computer program product comprising a non-transitory computer readable storage medium having program instructions embodied therewith, wherein the program instructions executable by a computer to cause the computer to:
    maintain, by the computer, a companion metadata file for each corresponding data file in a map-reduce system using the append-only file system, wherein each companion metadata file tracks a logical end-of-file (EOF) for each data file;
    maintain, by the computer, global versioning of each companion metadata file;
    perform, by the computer, a map-reduce append job for a set of data files a current global version number for the companion metadata file, wherein map-reduce job including multiple append tasks;
    for each successful append job, increment, by the computer, a logical EOF for each appended file to a new physical EOF;
    for each failed append task of the append job, maintain, by the computer, a logical EOF for each failed append task by not incrementing the logical EOF for each failed append task; and
    upon a determination that an existing metadata file exists with a version value set to a new version value, deleting, by the computer, the metadata file and creating a new metadata file on completion of a write instruction.

12. The computer program product of claim 11, wherein the program instructions further cause the computer to:
    perform, by the computer, periodic garbage collection comprising rewriting a data file, omitting invalid regions, updating the metadata file to purge all of the invalid regions, and pointing to the new logical EOF.

13. The computer program product of claim 12, wherein garbage collection is performed while all other read instructions are stopped.

14. A storage device comprising:
    a memory storing instructions; and
    a processor configured to execute the instructions including:
        maintaining a companion metadata file in the memory for each corresponding data file in an append-only file system, wherein each companion metadata file tracks a logical end-of-file (EOF) for each data file;

maintaining global versioning of each companion metadata in the memory;

performing a map-reduce append job for a set of data files using a current global version number for the companion metadata file, wherein the map-reduce job including multiple append tasks;

for each successful append job, incrementing a logical EOF for each appended file to a new physical EOF;

for each failed append task of the append job, maintaining a logical EOF for each failed append task by not incrementing the logical EOF for each failed append task; and upon a determination that an existing metadata file exists with a version value set to a new version value, deleting the metadata file and creating a new metadata file in the memory on completion of a write instruction.

15. The storage device of claim 14, wherein:

the processor uses global versioning to increment a valid companion metadata file version for each data file appended;

said valid companion metadata file version indicates the logical EOF corresponding to the new physical EOF for each of the data files appended; and subsequent append tasks that read a data file for retrying failed append tasks use metadata to stop reading upon reaching the logical EOF for the failed append task even when a current physical EOF is not reached.

16. The storage device of claim 14, wherein the processor is further configured to perform further instructions including:

for a failed append task:
  in a next successful append task updating the companion metadata file to skip a region corresponding to a failed append task; and
  in subsequent tasks, referring to said region as an invalid region; and
after a failed append task, in a subsequent append task, incrementing the logical EOF to a new physical EOF.

17. The storage device of claim 14, wherein the processor is further configured to perform further instructions including:

causing only a single writer to perform write instructions to avoid concurrent writers performing write instructions; and creating a new metadata file in the memory with the version set to the new version value.

18. The storage device of claim 14, wherein the processor is further configured to perform further instructions including:

for each data file being read:
  setting a local version value of a data file to a maximum metadata version value;
  reading a metadata file having the local version value;
  configuring a record reader for each record, split with invalid regions and the logical EOF; and
  reading data up to the logical EOF while skipping over invalid regions.

19. The storage device of claim 14, wherein the processor is further configured to perform further instructions including performing periodic garbage collection comprising rewriting a data file, omitting invalid regions, updating the metadata file to purge all of the invalid regions, and pointing to the new logical EOF.

20. The storage device of claim 19, wherein garbage collection is performed by the processor while all other read instructions are stopped.

* * * * *